United States Patent [19]

Drummond

[11] Patent Number: 5,690,897
[45] Date of Patent: Nov. 25, 1997

[54] METHOD FOR PURIFICATION OF CALCIUM CARBONATE

[75] Inventor: Donald Kendall Drummond, Glenmoore, Pa.

[73] Assignee: Minerals Technologies Inc., New York, N.Y.

[21] Appl. No.: 343,002

[22] Filed: Nov. 21, 1994

[51] Int. Cl.$^6$ .................................................. C01F 11/18
[52] U.S. Cl. ............................................ 423/173; 423/430
[58] Field of Search ...................................... 423/173, 430

[56] References Cited

U.S. PATENT DOCUMENTS

| | | | |
|---|---|---|---|
| 4,157,379 | 6/1979 | Arika et al. | 423/430 |
| 4,239,736 | 12/1980 | Fenske | 423/430 |
| 4,272,498 | 6/1981 | Faatz | 423/430 |
| 4,793,985 | 12/1988 | Price et al. | 423/430 |
| 4,824,653 | 4/1989 | Severinghaus, Jr. et al. | |

FOREIGN PATENT DOCUMENTS

| | | | |
|---|---|---|---|
| 64527 | 4/1984 | Japan | 423/430 |
| 983051 | 12/1982 | Russian Federation . | |

*Primary Examiner*—Wayne Langel
*Attorney, Agent, or Firm*—Marvin J. Powell; Terry B. Morris

[57] ABSTRACT

A method for lowering the iron content of calcium carbonate is disclosed. The method involves addition of an iron chelating agent to an aqueous calcium carbonate slurry, reducing the pH of the aqueous calcium carbonate by employing carbon dioxide containing gas, while maintaining the aqueous calcium carbonate slurry at an elevated temperature. The slurry is stirred, filtered, washed and dried. The calcium carbonate product resulting from the process of the present invention has a reduced iron content.

Calcium carbonate produced according to the method of this invention is particularly suitable for use as food or pharmaceutical additives and may also be useful as a filler in papermaking processes or as additives in plastic products.

10 Claims, No Drawings

METHOD FOR PURIFICATION OF CALCIUM CARBONATE

FIELD OF THE INVENTION

The present invention relates to a method of reducing the iron content of calcium carbonate. More particularly, the present invention relates to a method for purifying calcium carbonate. Even more particularly, the present invention relates to a method of lowering the content of iron in calcium carbonate slurries by treating the calcium carbonate slurry with a chelating agent such as, for example, ethylenediaminetetraacetic acid (EDTA).

Calcium carbonate produced according to the method of this invention is particularly suitable for use as food or pharmaceutical additives and may also be useful as a filler in papermaking processes or as an additive in plastic products.

1. Background of the Invention

The calcium carbonate in most limestone quarries contains some level of iron, usually in the form of iron oxide. However, the presence of iron in any form is sometimes considered to be a contaminant in the calcium carbonate. The presence of iron specifically precludes the use of this calcium carbonate in many specialty markets, such as food products and pharmaceutical applications. Furthermore, the presence of iron in calcium carbonate diminishes the economic value of final products in either papermaking processes or in the production of plastic.

Several physical and chemical processes have been suggested to remove iron from calcium carbonate. Physical removal first requires grinding the calcium carbonate to such fineness that the iron can then be removed by screening, classification, magnetic separation or flotation. Chemically leaching or bleaching the ground calcium carbonate with solvents followed by filtration has also been suggested as a method for removing iron from calcium carbonate. However, these physical and chemical processes for the removal of iron from calcium carbonate are complex and difficult to administer. Of equal concern are the erratic results; the unpredictable process efficiencies, the quantities of iron removed, and the expenses associated with many of the chemical and physical processes for removing iron from calcium carbonate.

What has been found to be novel and unanticipated by the prior art is a process for the purification of iron-containing calcium carbonate and the subsequent use of such purified calcium carbonate in applications and markets, such as, specialty grade products, for example, in food, plastics and pharmaceutical products where higher purity of the calcium carbonate is required.

It is therefore an object of the present invention to provide a simple, predictable, and inexpensive process for the purification of iron containing calcium carbonate. Another object of the present invention is to provide a purified calcium carbonate product that contains less than 500 parts per million of iron. A further object of the present invention is to provide a product that is particularly useful in food grade and pharmaceutical applications where purity of the calcium carbonate is a requirement.

These and other objects of the present invention will become apparent as further provided in the detailed specification which follows.

2. Prior Related Art

U.S. Pat. No. 4,824,653 discloses a process for bleaching limestone by first grinding the limestone into small sizes by conventional methods of either wet or dry grinding. The ground limestone is then mixed with water to form a slurry having a solids content of approximately 15 percent to 50 percent. A chelating agent, such as ethylenediaminetetraacetic (EDTA), and a bleaching agent, such as sodium hydrosulfite, are added to the slurry and mixed at an elevated temperature before filtering and drying. The limestone product produced according to the process of this invention exhibits enhanced whiteness.

SUMMARY OF THE INVENTION

What has been found to be novel and unanticipated by the prior art is a method for the purification of iron-containing calcium carbonate. The iron content of the calcium carbonate is substantially lowered by treating an aqueous calcium carbonate slurry with an iron chelating agent, while heating the slurry and treating the slurry with carbon dioxide. The extracted iron is then separated from the calcium carbonate by filtration.

The purified calcium carbonate product produced according to the method of the present invention is particularly useful in food grade products, paper products, coatings, and plastic products, where reduced iron content is required.

DETAILED DESCRIPTION OF THE INVENTION

The present invention involves a process for reducing the iron content of calcium carbonate. The iron in the calcium carbonate is extracted by treating an aqueous calcium carbonate slurry with an iron chelating agent while heating and agitating the slurry and introducing a carbon dioxide containing gas to control the pH during the extraction process. The extracted iron is then separated from the calcium carbonate by filtration. The purification process of the present invention may be used for reducing the iron content of any limestone product. This includes USP and food grade products, paper filling and coating products, and plastic filling products.

Calcium carbonates that are useful in the present invention include but are not limited to any calcium carbonate containing mineral, for example, limestone, chalk, dolomite, and synthetically produced precipitated calcium carbonate. The calcium carbonate is processed as an aqueous slurry of from about 1 weight percent to about 70 weight percent calcium carbonate, based on the total weight of the slurry. The preferred weight concentration of the calcium carbonate is from about 10 percent to about 30 weight percent calcium carbonate, based on the total weight of the slurry. Slurry concentrations of less than about 10 weight percent based on the total weight of the slurry tend to be not practical based on economical considerations. Higher than about 30 weight percent calcium carbonate based on the total weight of the slurry may require the use of a dispersant, which could interfere with the extraction process, although not necessarily. Routine experimentation would determine which dispersant could be used in the present inventive process.

Iron chelating agents useful in the method of the present invention may be any material capable of complexing iron, more especially the chelating agent should have a much greater formation constant with iron than with calcium. Chelating agents especially useful in the method of the present invention are selected from the group comprising nitrilotriacetic acid ($H_3NTA$), ethylenediaminetetraacetic acid ($H_4EDTA$), diethylenetriaminepentaacetic acid ($H_5DPTA$), and hydroxyethylethylenediaminetriacetic acid ($H_3HEDTA$) and salts thereof. The preferred chelating agent is ethylenediaminetetraacetic acid (EDTA) and any salt thereof. The iron-containing calcium carbonate is treated with from about 0.01 percent to about 10 percent chelating agent. When the chelating agent is EDTA the preferred treatment level is from about 0.1 weight percent to about 1.0 weight percent based on the weight of the calcium carbonate present, depending on the amount of iron present in the calcium carbonate.

The carbon dioxide containing gas useful in the process of the present invention contains between about 1 percent to about 100 percent $CO_2$ on a volume basis. Typical $CO_2$ concentrations are in the range of about 10 percent to about 30 percent $CO_2$ on a volume basis. Inasmuch as the above described carbon dioxide containing gas is used to control the pH of the calcium carbonate slurry the rate of addition of said $CO_2$ containing gas is adjusted to maintain the slurry pH in the range of about 5.5 to about 7.0, preferably about 6.0 to about 6.5.

The calcium carbonate slurry, and chelating agent are heated at an elevated temperature range of from about 20 degrees to about 100 degrees Centigrade. The preferred temperature range is from about 40 degrees to about 60 degrees Centigrade. The slurry is stirred, filtered, washed and dried.

It is believed that by employing an iron chelating agent, while controlling temperature and pH, promotes the dissolution of iron in calcium carbonate. The dissolved iron is complexed by the chelating agent. As the iron is dissolved by lowering the pH and elevating the temperature, iron is complexed by the chelating agent and shifts equilibrium toward solubilizing more iron. Additionally, the lower pH provides a higher formation constant between the iron and chelating agent thereby improving the overall equilibrium toward iron solubilization. The calcium carbonate and iron are then separated by filtration with the filtrate containing the complexed iron. However, what is being suggested here is a theory of why the method of the present invention lowers the iron containing calcium carbonate. It should be accepted as only a theory of why the invention works and should not under any conditions whatsoever be employed to limit the scope of the present invention, which is further illustrated by the examples which follow and more specifically defined by the claims.

EXAMPLES 1 THROUGH 6

In Examples 1 through 6 (untreated) calcium carbonate having an iron content of 715 ppm $Fe_2O_3$ was treated in slurry form with 0.33 weight percent EDTA for varying treatment times, at different treatment temperatures, and at different slurry pH values. The resulting treated calcium carbonate slurries were filtered, the thus obtained treated products were washed, dried, and analyzed for $Fe_2O_3$ content. The experiments were carried out as follows:

EXAMPLE 1

To 81 ml of deionized water was added 9 ml of a 0.01 molar $Na_2H_2$ $EDTA.2H_2O$ solution. To the above stirred solution was added 10 grams of precipitated calcium carbonate. The slurry was then heated to 60° C. and stirred at 60° C. for 24 hours. The slurry pH was 8.0 and remained 8.0 as no pH control (no $CO_2$) was used in this treatment. The slurry was filtered, the collected solids were washed with de-ionized water, and subsequently dried.

EXAMPLE 2

In the same manner as described in Example 1, to 90 ml of de-ionized water containing 9 ml of 0.01 molar $Na_2H_2$ $EDTA.2H_2O$ solution was added 10 grams of precipitated calcium carbonate. While stirring, $CO_2$ was introduced into the slurry to adjust the slurry pH to 6.0 and the slurry was heated to 60° C. The slurry was stirred for 24 hours at 60° C., maintaining the pH at 6.0 by introducing $CO_2$ as needed. The resulting treated calcium carbonate slurry was further processed as in Example 1.

EXAMPLE 3

In the same manner as Example 2, the calcium carbonate product was treated with 0.33 weight percent EDTA in slurry form at a temperature of 60° C. at pH 6.0, using $CO_2$ to control the pH, for only 2 hours. The resulting slurry was processed as in Example 1.

EXAMPLE 4

In the same manner as Example 2, the calcium carbonate product was treated with 0.33 weight percent EDTA in slurry form at a temperature of 60° C., at pH 6.0, using $CO_2$ to control the pH, for only 1 hour. The resulting slurry was processed as in Example 1.

EXAMPLE 5

In the same manner as described in Example 2, the calcium carbonate product was treated with 0.33 weight percent EDTA in slurry form, the slurry pH was adjusted to 6.0 and maintained at 6.0 using $CO_2$. The slurry was heated to 40° C. with stirring and maintained at 40° C., pH 6.0 for 3 hours. The resulting treated product was further processed as in Example 1.

EXAMPLE 6

In the same manner as described in Example 5, the calcium carbonate product was treated with 0.33 weight percent EDTA in slurry form at a temperature of 40° C. and pH 6.0 for only 1 hour. The resulting product was then further processed by filtering, washing, and drying as in Example 1.

TABLE

| Example | Treatment | Atmosphere | PH | Temp. °C. | Stirring Time (Hr.) | Resulting Product ppm $Fe_2O_3$ |
|---|---|---|---|---|---|---|
| | Precipitated Calcium Carbonate No-Treatment | — | — | — | — | 715 |
| 1 | 0.33 Wt. % EDTA | Air | 8.0 | 60 | 24 | 701 |
| 2 | 0.33 Wt. % EDTA | $CO_2$ | 6.0 | 60 | 24 | 286 |
| 3 | 0.33 Wt. % EDTA | $CO_2$ | 6.0 | 60 | 2 | 272 |
| 4 | 0.33 Wt. % EDTA | $CO_2$ | 6.0 | 60 | 1 | 315 |
| 5 | 0.33 Wt. % EDTA | $CO_2$ | 6.0 | 40 | 3 | 372 |
| 6 | 0.33 Wt. % EDTA | $CO_2$ | 6.0 | 40 | 2 | 415 |

The treated calcium carbonate products were analyzed for iron content and are compared to the untreated calcium carbonate in the Table. The data in the Table show the value of pH adjustment, the value of elevated temperatures, and the effect of the present inventive process for iron removal.

I claim:

1. A process for lowering the iron content of calcium carbonate which contains iron comprising treating an aqueous slurry of said calcium carbonate with a chelating agent, heating said aqueous calcium carbonate slurry containing said chelating agent and treating said aqueous calcium carbonate slurry containing said chelating agent with carbon dioxide gas, wherein said treating with said chelating agent is performed while heating and agitating said slurry and introducing said carbon dioxide gas to maintain a pH of said slurry in the range of about 5.5 to no higher than 7.0.

2. The process of claim 1 wherein the concentration of the calcium carbonate in the aqueous calcium carbonate slurry is from about 1 weight percent to about 70 weight percent, based on the total weight of the calcium carbonate slurry.

3. The process of claim 1 wherein the concentration of the calcium carbonate in the aqueous calcium carbonate slurry is from about 10 percent to about 30 weight percent, based on the total weight of the calcium carbonate slurry.

4. The process of claim 1 wherein the chelating agent is selected from the group consisting of nitrilotriacetic acid, ethylenediaminetetraacetic acid, diethylenetriaminedentaacetic acid, hydroxyethylethylenediaminetriacetic acid and salts thereof.

5. The process of claim 4 wherein the amount of chelating agent is from about 0.01 weight percent to about 10 percent weight percent based on the weight of the calcium carbonate.

6. The process of claim 4 wherein the chelating agent is ethylenediaminetetraacetic acid and wherein the amount of chelating agent is from about 0.1 weight percent to about 1.0 weight percent based on the weight of the calcium carbonate.

7. The process of claim 1 wherein the carbon dioxide containing gas has a $CO_2$ concentration of from about 1 percent to about 100 percent.

8. The process of claim 1 wherein the carbon dioxide containing gas has a $CO_2$ concentration of from about 1 percent to about 100 percent and wherein the PH is maintained at from about 6.0 to about 6.5.

9. The process of claim 1 wherein the temperature of the aqueous calcium carbonate slurry is from about 20 degrees to about 100 degrees centigrade.

10. The process of claim 9 wherein the temperature of the aqueous calcium carbonate slurry is from about 40 degrees to about 60 degrees centigrade.

* * * * *

UNITED STATES PATENT AND TRADEMARK OFFICE
CERTIFICATE OF CORRECTION

PATENT NO. : 5,690,897

DATED : November 25, 1997

INVENTOR(S) : Donald Kendall Drummond

It is certified that error appears in the above-identified patent and that said Letters Patent is hereby corrected as shown below:

In column 5, line 17, change "diethylentriaminedentaacetic" to "diethylentriaminepentaacetic."

Signed and Sealed this

Seventeenth Day of March, 1998

Attest:

BRUCE LEHMAN

*Attesting Officer*  *Commissioner of Patents and Trademarks*